UNITED STATES PATENT OFFICE.

ARTHUR HENRY STALAY HOLT, OF LUDWIGSHAFEN, GERMANY, ASSIGNOR TO THE BADISCHE ANILIN AND SODA FABRIK, OF SAME PLACE.

PROCESS OF MAKING AN INDIGO-LEUCO COMPOUND.

SPECIFICATION forming part of Letters Patent No. 661,871, dated November 13, 1900.

Application filed November 29, 1899. Serial No. 738,663. (No specimens.)

*To all whom it may concern:*

Be it known that I, ARTHUR HENRY STALAY HOLT, doctor of philosophy, a subject of the Queen of Great Britain and Ireland, residing at Ludwigshafen-on-the-Rhine, in the Kingdom of Bavaria and Empire of Germany, have invented new and useful Improvements in Processes of Preparing Indigo-Leuco Compound, of which the following is a specification.

In Patent No. 643,502, dated February 13, 1900, I have described the process for preparing indigo-leuco compound by treatment of an anthranilic acid body with a polyhydroxy compound of the fatty series.

My present invention relates to improvements in the said process. I have found that it is possible to divide the said process into two phases, so as to produce intermediate products, which may be either isolated and so freed from by-products, or without such isolation the process can be continued immediately for the production of the indigo-leuco compound. My discovery of the production of the intermediate products has resulted in the advantage that the conditions may be so chosen at first that as much as possible of the desired intermediate products in each case are obtained, and subsequently the conditions most suitable for the conversion of the said intermediate products into indigo can be adopted.

My new process consists in preparing a mixture of an anthranilic acid body and a polyhydroxy compound of the fatty series and caustic alkali and causing them to act upon one another at such temperatures that chemical reaction takes places, accompanied with the evolution of gas, but no production of indigo-leuco compound ensues. From the melt so obtained the intermediate products obtained can, if desired, be isolated in a suitable way and converted into indigo by any known method for the purpose. The intermediate products obtained according to my new process are generically amido acids, which are soluble in alkalies and acids and can be obtained by carefully neutralizing the alkaline solution and, if necessary, evaporating the neutral solution. In the specific cases where glycerin or mannite respectively are the polyhydroxy compounds used the main constituent of the intermediate compound formed is phenylglycocoll-ortho-carboxylic acid.

The conversion of the intermediate products into the indigo-leuco compound can be effected by further heating with alkalies either before or after isolation from the melt, or, if desired, it can be effected by other agents for separating off water, such as acetic anhydride, according to known methods.

The following examples will serve to further illustrate the nature of my invention and the manner in which my new process can be carried into practical effect.

Example 1: Intimately mix one hundred and thirty-seven (137) parts of anthranilic acid with three hundred and forty-two (342) parts of powdered caustic potash and heat the mixture to about 150° centigrade in a vessel provided with a stirring apparatus. Slowly add two hundred and seventy (270) parts of glycerin to the mixture. Raise the temperature to 220° centigrade and heat for about one hour or until the energetic evolution of hydrogen has ceased. Dissolve the melt when cold in water, filter, and neutralize exactly with mineral acid. The precipitated phenylglycocoll-ortho-carboxylic acid is obtained in white needles, having a fusion-point of from 218° to 220° centigrade.

Example 2: Heat an intimate mixture of one hundred and thirty-seven (137) parts of anthranilic acid, one hundred and eighty (180) parts of mannite, and two hundred and thirty (230) parts of powdered caustic potash in a vessel provided with a stirring arrangement for about two hours until the evolution of hydrogen has ceased. Work up the melt as in the preceding example.

Example 3: Prepare a mixture of one hundred and thirty-seven (137) parts anthranilic acid, one hundred and sixty-five (165) parts of pure well-dried cellulose, and two hundred and twenty-five (225) parts of powdered caustic potash. Heat the mixture in a vessel provided with a stirrer slowly to a temperature of 220° centigrade and maintain this heat for about one hour. Allow the melt to cool, dissolve it in water, filter, and neutralize it exactly with a mineral acid, so as to precipitate the phenylglycocoll-ortho-carboxylic acid. Instead of pure cellulose sawdust or other raw material containing cellulose can be used without materially changing the conditions given in the above example. It is desirable that the sawdust should have been previously treated in accordance with the bisulphite process or by boiling it with alkali and acids in the known way.

Example 4: Intimately mix one hundred and thirty-seven (137) parts of anthranilic acid, one hundred and eighty (180) parts of well-dried starch, and two hundred and twenty-four (224) parts of powdered caustic potash, and while stirring heat, to begin with, for one hour at 210° centigrade and then for a quarter of an hour at 250° centigrade. Work up the melt as described in example 1. In a similar way other polyhydric bodies can, by heating with anthranilic acid and caustic alkali, be employed for producing phenylglycocoll-ortho-carboxylic or analogous intermediate products.

Example 5: To convert the intermediate products obtained according to the first phase of the new process into indigo, proceed as follows:

A. Mix one part of the pure or impure intermediate product obtained in accordance with the foregoing examples with about three (3) parts of a caustic alkali and heat the mixture until the intensity of the color of the melt obtained no longer increases and test portions dissolved in water and treated with air show that no further increase in the quantity of indigo-leuco compound formed is taking place. Then allow the melt to cool and work up in any desired way.

B. Take the solution of phenylglycocoll-ortho-carboxylic acid obtained when working in accordance with example 1 and neutralize it with sodium carbonate solution. Evaporate to dryness. Mix one part of the sodium salt so obtained with about four parts of boiling acetic anhydride, to which sodium acetate may be added, if desired. When the reaction is completed, distil off the acid anhydride and saponify the residue by boiling with an alkali. The solution so obtained contains the indigo-leuco compound. This can be precipitated by the addition of acid, or, if desired, the solution can be diluted and treated with air, so as to obtain indigo.

Now what I claim is—

1. The new process consisting in treating a polyhydroxy compound of the fatty series and an anthranilic acid body and a caustic alkali at a high temperature until a chemical reaction indicated by the evolution of gas takes place while no formation of indigo-leuco compound ensues, then isolating the intermediate product formed and converting it into indigo-leuco compound by heating with caustic alkali all substantially as described.

2. The new process consisting in treating a polyhydroxy compound of the fatty series, an anthranilic acid body and a caustic alkali at a high temperature until a chemical reaction indicated by the evolution of gas takes place while no formation of indigo-leuco compound ensues and converting the intermediate product formed into indigo-leuco compound by treating it with an agent for separating off water, all substantially as described.

3. The new process consisting in treating a polyhydroxy compound of the fatty series, and an anthranilic acid body and a caustic alkali at a high temperature until a chemical reaction indicated by the evolution of gas takes place while no formation of indigo-leuco compound ensues and converting the intermediate product formed into indigo-leuco compound by heating with alkali all substantially as described.

4. The new process consisting in treating a polyhydroxy compound of the fatty series, an anthranilic acid body and a caustic alkali at a high temperature until a chemical reaction indicated by the evolution of gas takes place while no indigo-leuco compound ensues then isolating the intermediate product formed all substantially as described.

In testimony whereof I have hereunto set my hand in the presence of two subscribing witnesses.

ARTHUR HENRY STALAY HOLT.

Witnesses:
JOHN PERCY JONES,
JACOB ADRIAN.